July 17, 1973   EIKI SHIMAZAKI ET AL   3,746,557
HARDENING AGENT FOR REFRACTORY USE AND PRODUCTION THEREOF
Filed July 29, 1971
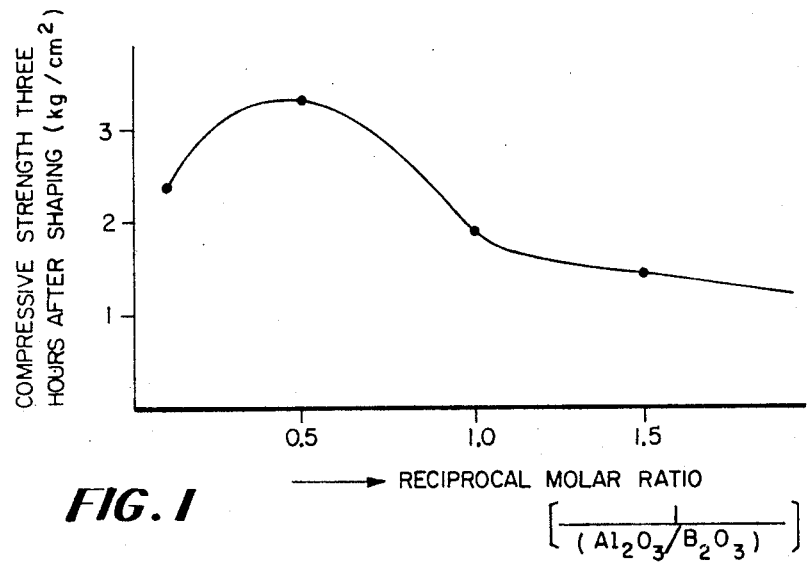
FIG. I
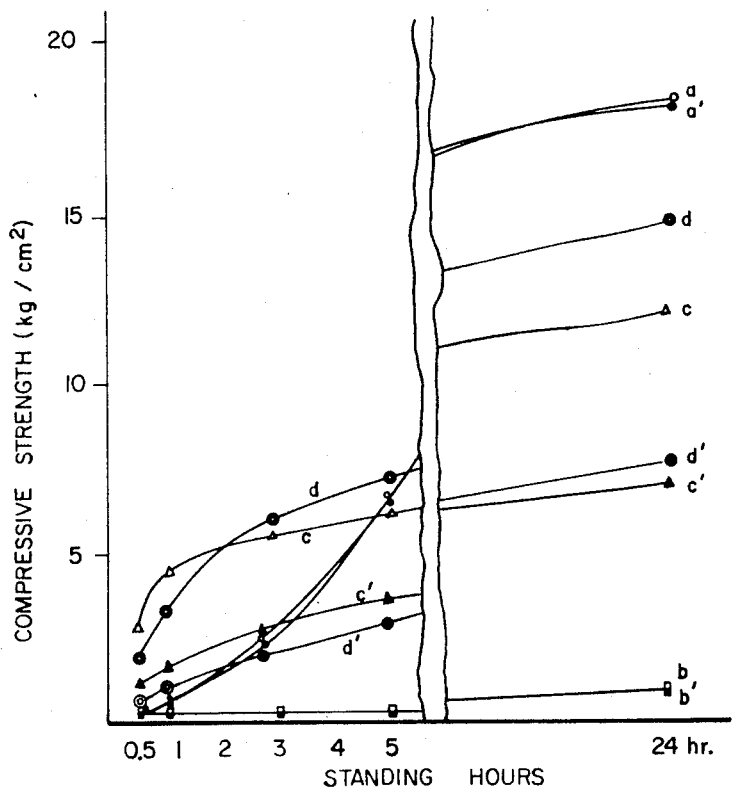
FIG. 2

United States Patent Office 3,746,557
Patented July 17, 1973

3,746,557
HARDENING AGENT FOR REFRACTORY USE AND PRODUCTION THEREOF
Eiki Shimazaki, Shunji Araki, and Hakuichi Akazawa, Kakogawa, Japan, assignors to Taki Fertilizer Manufacturing Co., Ltd., Kakogawa, Japan
Filed July 29, 1971, Ser. No. 167,343
Claims priority, application Japan, July 29, 1970, 45/66,322
Int. Cl. C04b 35/02
U.S. Cl. 106—65       12 Claims

ABSTRACT OF THE DISCLOSURE

A novel hardening agent for refractory use in combination with a phosphate- or phosphoric acid-type binder is provided which comprises active aluminum hydroxide-borate complex in which the molar ratio, $Al_2O_3/B_2O_3$, lies within the range of about 1 to 24. The hardening agent is produced by a reaction, in the presence of a water of an aluminum compound selected from the group consisting of aluminum alcoholates and aluminum phenolate with a boric compound selected from the group consisting of boric acid, ammonium borate, alkali borates and boric esters in a proportion as to bring the molar ratio, $Al_2O_3/B_2O_3$, within the range of about 1 to 24.

---

This invention relates to a novel hardening agent for a phosphate or phosphoric acid type binder to be used for making a refractory body and also to a process of making such hardening agent.

More particularly the invention relates to a novel hardening agent for refractory use in combination with a phosphate- or phosphoric acid-type binder, and consisting essentially of active aluminum hydroxide-borate complex.

In recent years a variety of phosphate-type compounds have come to be used as refractory binders for bricks, castables, stampling materials, plastics and other refractory products. For example, phosphoric acid, mono-aluminum phosphate (aluminum primary phosphate), polyphosphate, polyphosphoric acid, alkyl acid phosphate and the like have some favorable properties as refractory binder. In order to make a refractory body with these phosphate-type binders, however, heating (or firing) of the mixture of a binder with aggregates or addition of a hardening agent to the mixture is required.

Hardening (or curing) by heating is undesirable from a commercial as well as technical point of view especially when a refractory body of comparatively large size is concerned. This seems to be one of the reasons why various efforts have been made to seek for a more effective hardening agent.

In general the following properties are considered indispensable for such hardening agent: (1) having no adverse effect on the thermal behavior or property of refractory binder itself and of the final product; (2) sufficient effectiveness in its hardening action even at room or ordinary temperature; (3) rapid hardening after a reasonable length of pot-life or induction time; (4) imparting satisfactory strength to the hardened body; (5) causing no adverse effect to the volume stability of the hardened body; (6) easiness in handling, e.g. being easy to be mixed with aggregates and other materials, having easy-to-control hardening effect by simply changing the blending proportions, having little or no change in the hardening effect with the lapse of time, and having no trend to evolve any harmful or poisonous gases.

Although such materials as magnesium oxide, calcium silicate, basic magnesium salt, aluminum powder, active aluminum hydroxide and basic aluminum salt have been proposed as hardening agents for phosphate-type refractory binders, none of them have succeeded in satisfying all of the aforementioned requirements.

Thus, for example, while divalent-metal salts such as magnesium salts and calcium salts have comparatively good hardening action, they are known to be not very eligible because they impart inferior high-temperature characteristics to the hardened body. In order not to impair the high-temperature characteristics of the resulting hardened body, trivalent-metal salts in general, especially aluminum salts containing metal-oxygen bonds are preferred. However, those aluminum compounds as mentioned before are far from ideal in that some of them harden the refractory body too rapidly (there is no reasonable length of pot-life) or conversely, too inactive to be applicable; that in some cases evolution of a large amount of gases often containing corrosive ones occurs; that most of them tend to deteriorate or degenerate with the lapse of time, especially with the change of humidity and/or temperature; that some are so heat-sensitive as to often lose their reactivity almost completely by prolonged heating-history during their manufacture.

Accordingly, it is an object of the present invention to provide a class of new and highly effective hardening agents which have no such difficulties as pointed out above.

Another object of this invention is the provision of a process for producing such hardening agents.

These and other objects will become apparent from the following description, which is made by partly referring to the accompanying drawings wherein:

FIG. 1 is a graph illustrating the relation between the molar ratio ($Al_2O_3/B_2O_3$) in the hardening agent of the invention and compressive strength of the resulting refractory body; and FIG. 2 is a graph illustrating the relation between the compressive strength of the resulting refractory body and the kind of hardening agent used for making the refractory body.

We have made extensive investigations to provide a new type of hardening agent having superior quality without the drawbacks seen in the known aluminum compounds but retaining their excellent thermal characteristics, we have found that a class of active aluminum hydroxide borate complexes work just as ideally as hardening agents for phosphate- and phosphoric acid-type binders.

Briefly, this invention provides a novel hardening agent for refractory use in combination with phosphate- and phosphoric acid-type binders which comprises active aluminum hydroxide-borate complex wherein molar ratio, $Al_2O_3/B_2O_3$, lies within the range of about 1 to 24.

This invention also provides a process of preparing such new hardening agent for phosphate- and phosphoric-acid-type binders which comprises reacting in the presence of a proper amount of water an aluminum compound selected from the group consisting of aluminum alcoholates and aluminum phenolate with a boric compound selected from the group consisting of boric acid, ammonium borate, alkali borates and boric esters in such a proportion as to bring the molar ratio, $Al_2O_3/B_2O_3$, within the range of about 1 to 24, and, if necessary, drying the reaction mixture. In some preferable embodiments of the invention the drying of the reaction mixture may be conveniently conducted by igniting the organic matters liberated by the reaction.

Active aluminum hydroxide-borate complex of the invention may also be produced starting from active aluminum hydroxide, or so-called fresh alumina gel as the aluminum compound.

When crystalline aluminum hydroxide is employed, however, no such complex is formed. Instead, there is formed an inactive crystalline product, i.e., a product that does not harden at room temperature the refractory body bound by a phosphoric acid or phosphate type binder.

In a preferable embodiment of our invention, immediately after the aluminum hydroxide is freshly prepared without heating, it is reacted with boric acid or other borates. This immediate processing of the freshly prepared aluminum hydroxide is often indispensable, since active aluminum hydroxide, though it is amorphous at first, tends to crystallize as time passes. We have found that this tendency is prevented by complexing the freshly prepared aluminum hydroxide with boric acid. This perhaps accounts for the activeness and its invariability of aluminum hydroxide-borate complex of the present invention.

The evidence for the existence of definite aluminum borate has heretofore been considered to be very unsatisfactory and few attempts have been made to make and utilize such product.

However, we have now established a convenient process for the production of active aluminum hydroxide-borate complex and have found that the product is useful as a refractory binder.

The active aluminum hydroxide or so-called fresh alumina gel to be employed in this invention can be produced by any known method or can be introduced in the manufacturing process of hardening agents of the present invention in such a way that it is formed in situ. Anyway, in view of the requisites of the product, substantial contamination of alkali metal ions, certain alkali-earth metal ions, chloride-, sulfate- and nitrate ions and the like which may cause unfavorable influence on the hardening characteristics of the product and hence on the refractoriness of the final hardened body should be avoided.

Active aluminum hydroxide or fresh aluminum gel to be used in this invention, on the other hand, is defined as one having amorphous structure on X-ray diagram and being easy to react with and dissolve in dilute acids, such as HCl, $H_2SO_4$, $HNO_3$, $CH_3COOH$ of pH 1.0–1.5. As is well known, alumina gel of this kind is subject to change called "ageing" and gradual increase of its crystallinity degenerating into an inactive species through heating or long standing. Although the amorphous state is still maintained on X-ray diagram at an earlier stage of this change, its activeness to weak acids is greatly diminished or, as the case may be, practically lost.

The active aluminum hydroxide or fresh alumina gel can be used either in the form of wet gel or dry powder but anyway it must be used before it loses its activeness.

As for the boric acid and other salts and esters of boric acid particularly in the case of the latters, it goes without saying that the same requirements or limitations that was mentioned before in regard to the active aluminum hydroxide are applied. Thus, contamination of those ineligible metal ions and/or acid ions must be avoided as hard as possible, but when the high temperature characteristics of only moderate strictness are required, a tolerable amount of the borates of such metals can be used according to the precise design of such products.

Borates to be used in this invention not only refers to ordinary inorganic orthoborates but also to those which can liberate borate groups on thermal or hydrolytic decomposition, e.g., inorganic salts of boric acid, boric esters and the like. To sum up, borates as referred to in the present invention include ammonium-, sodium-, potassium- and lithium salts of orthoboric acid and metaboric acid; mono-, di-, and triesters of boric acid of methanol, ethanol, propanol, butanol, amyl alcohol, hexanol, heptanol, octanol, and the like. In most cases where boric acid is employed, metaboric acid can also be used instead.

Further, aluminum compounds other than active aluminum hydroxide or fresh alumina gel which are more preferably employed as starting materials of the product of this invention include aluminum methylate, aluminum ethylate, aluminum propylate, aluminum butylate, aluminum amylate, aluminum hexylate, aluminum heptylate, aluminum octylate, etc. Alcoholates of mixed alcohols and partial alcoholates are also included.

According to the present invention, active aluminum hydroxide or fresh alumina gel, or more preferably an aluminum compound capable of forming in situ active aluminum hydroxide when met by water such as aluminum alcoholate, aluminum phenolate and the like is treated, in the persence of a sufficient amount of water to react with every hydrolizable group concerned (usually about 50–400 g. water for one mol $Al_2O_3$ equivalent), with boric acid, or any other borate exemplified above in an equivalent proportion to the molar ratio, $Al_2O_3/B_2O_3$, of 1–24, and then the reaction mixture is dried at temperatures lower than ca. 200° C.

For example, when active aluminum hydroxide and boric acid are used, 100 parts by weight (calculated as $Al_2O_3$) of the former is made to react with 5–100 or more preferably 14–70 parts by weight of the latter.

The boric acid or other borates may be incorporated as a solution or suspension in water, or otherwise, following any other usual method, e.g., wetting the whole with water after mixing with active aluminum hydroxide or other aluminum hydroxide source.

The drying temperature should be about 200° C. or below because of the probable fusion of boric acid and consequent agglomeration of the product as well as the tendency of the dried product to lose gradually its expected hardening ability when dried at higher temperatures.

Drying can be done by any known method usually applied for drying wet powders or slurries. In some cases it can also be done without external heating, that is, by drying under sunshine or by natural drying in the shade. In cases where materials yielding alcohols and/or other inflammable liquids through hydrolysis are used the heat of combustion may be well utilized by igniting the liberated alcohols and the like.

These and other ways of drying are more easily and economically done particularly with aluminum alcoholates and/or boric esters having more preferred alkyl groups of one to five carbon atoms. This limitation of alkyls in connection with their carbon atoms is also based on the fact that with higher alkyls unfavorable influence on the reactivity of the product often prevails unless they are removed.

The proportions (in molar ratio) of boric acid or borate and the aluminum compound are 1–24 as $Al_2O_3/B_2O_3$ as mentioned above. This molar ratio is desirable in obtaining products with optimum activity and stability. Thus, if the amount of boric acid or borate is smaller than that specified above it will be insufficient to suppress the decrease of activity of aluminum hydroxide owing to the heating in the process and other changes with time. On the other hand, if the amount is much larger, unfavorable effects on the hardening ability and other characteristics of the product occur, thus adversely affecting the thermal properties of the resulting refractory body, though the initial activity is well maintained with its good stability during drying.

Thus the dried products of the invention retain the same activeness or reactivity of the original active aluminum hydroxide and do not undergo any change in their reactivity under varying humidity and temperature conditions for a long time.

Further it has been found that hardening characteristics of a refractory mixture bound by a phosphoric acid or phosphate type binder can be controlled to some extent by changing the proportion of $B_2O_3$ content in the hardening agent within a limited region.

In this connection, reference may be made to FIG. 1 which shows typical experimental results. Thus, against the reciprocals of molar ratio, $Al_2O_3/B_2O_3$, are plotted values of compressive strength measured three hours after the forming of each columniform shaped body (50 mm. x 50 mm.) from zircon sand (100 parts by weight), aluminum chromium phosphate solution (composition: $Al_2O_3$ 5.7%; $B_2O_3$ 24.6%; $Cr_2O_3$ 2.5%) (15 parts by weight) and a hardening agent prepared by the process disclosed later in Example 6 (2.0 parts by weight).

It will be noted that the reactivity or activeness of aluminum hydroxide is controllable by treating the active aluminum hydroxide with boric acid or borate. The reactivity of active aluminum hydroxide is often too high right after its preparation to permit an adequate length of pot-life though it weakens to moderation through some natural changes with time or in the course of deliberate thermal treatments. And indeed it turns handy after these changes or treatments, but these changes with time go further on to lead to the eventual loss of reactivity, and it is very difficult to keep the reactivity of active aluminum hydroxide on a fixed level.

On the other hand, aluminum hydroxide-borate type hardening agents of the present invention have practically no change in their reactivity with the lapse of time, and they have an outstanding commercial and technical merit that their reactivity can be controlled freely.

Details about the chemical structure of the product, e.g., whether it is a single chemical species or a mixture of several kinds are not well known yet.

The new hardening agents of the present invention can be used just in the same way as other known hardening agents. They are particularly suitable for use with phosphoric acid and phosphate type binders in making unfired refractory bodies.

The phosphoric acid and phosphate type binders to be used in combination with the hardening agents of this invention include phosphoric acid, polyphosphoric acid, mono aluminum phosphate, aluminum-chromium primary phosphate, mono magnesium phosphate, monocalcium phosphate, monobarium phosphate and other soluble acid phosphate binders.

As for the aggregates, any known kind that is ordinary bound by the above mentioned phosphoric acid and phosphate type binders may be used. For instance, chamotte, quartz sand, zircon sand, fused silica, fired bauxite, corundum, silicon carbide, glass fibers, etc. are employed according to the refractoriness desired.

In general, the binder is used in an amount ranging from 10 to 30% by weight based on aggregates. The amount of the hardening agent of the present invention may vary over a wide range but it is usually about 2 to 15% by weight based on the total amount of the binder.

The hardening agent of the present invention, in a preferable amount of 2-15% of the total amount of the binder is preferable to be blended with an appropriate aggregate prior to the subsequent introduction of the binder.

The following examples illustrate the invention, but they are not intended to limit the scope of the invention. The parts and percentages are by weight unless otherwise specified.

EXAMPLE 1

Active aluminum hydroxide was prepared from aluminum sulfate in the usual manner. It was washed repeatedly till the filtrate proved free of sulfate ion. The mass (containing ca. 2.5 kg. $Al_2O_3$) was blended with 1.55 kg. boric acid in a blender and then, after addition of water just enough to turn the whole a slurry, was dried by heating from outside while blending to give a free-flowing fine white powder.

EXAMPLE 2

To a wet gel of fresh alumina hydrate prepared from aluminum chloride solution and washed in a usual manner, a hot solution of ammonium borate and boric acid (1:1) required to make the molar ratio ($Al_2O_3/B_2O_3$) 1.5 was added and the mixture was dried by external heating while blending. The final drying temperature was 130° C. A white amorphous powder was obtained.

EXAMPLE 3

Active aluminum hydroxide obtained by low temperature hydrolysis of aluminum ethylate was treated with boric acid in the same manner as in Example 1. After drying at 100° C., a hardening agent in the form of fine white powder which had a molar ratio, $Al_2O_3/B_2O_3$, of 2.5 was obtained.

EXAMPLE 4

4.8 kg. aluminum methylate powder and 0.65 kg. boric acid powder were blended together. To this blend, water was added little by little till the appearance of the blend first came to look like that of wet sands. After well mixing the mass the methanol liberated through the hydrolysis was lit and burned under agitation from time to time. At the end of the combustion there were left 4.42 kg. of white dry powder.

EXAMPLE 5

To a solution of 28 g. trimethyl borate in 200 ml. methanol 400 g. freeze-dried active aluminum hydroxide were added and dispersed well. Then 250 g. of 50% methanol-water solution were added and the mixture was stirred up to hydrolyze completely. 519 g. of amorphous white powder were left after the combustion of liberated methanol was completed under blending.

EXAMPLE 6

After dispersing 480 g. aluminum methylate in a solution of 208 g. trimethyl borate, co-hydrolysis was conducted with the addition of 50% methanol-water solution. The alumina hydrate-borate gel thus obtained was lit in the open air, and there were obtained 410 g. of amorphous white powder when the combustion-drying was over.

EXAMPLE 7

7.8 kg. of washed filter-cake of active aluminum hydroxide (equivalent to ca. 1 kg. $Al_2O_3$) were mixed with 1 kg. boric acid and 0.3 kg. potassium borate. After well blending the mixture was placed on a tray and dried in a ventilated drying box at 50° C. The dried body easily gave way into a white powder.

EXAMPLE 8

The procedure of Example 1 was repeated except that the drying was carried out under sunshine without heating. An amorphous white powder was obtained.

Comparison 1

Commercial alumina hydroxide (from Bayer's Process) was treated with boric acid in the same manner as in Example 1.

Comparison 2

Active aluminum hydroxide of the same type as in Example 1 was dried naturally on a tray in the shade. The dried body was pulverized to give a fine powdered alumina hydrate gel.

Comparison 3

Active aluminum hydroxide of the same type as in Example 1 was dried at 80° C. in a hot-blast dryer. The dried mass was milled into a white powder.

EXAMPLE 9

12.25 kg. aluminum phenolate and 0.46 kg. metaboric acid were blended together. To this blend there were added 3 kg. $H_2O$ and the whole was mixed thoroughly. The wet mixture was then dried by vacuum distillation of the liberated phenol and excess water. 4.3 kg. of white powder were obtained.

EXAMPLE 10

The procedure of any of the examples above where aluminum alcoholate is employed is followed, except that any other one of the aluminum alcoholates described herein is substituted for the particular aluminum alcoholate cited in the specific example. The products with these other aluminum alcoholates are satisfactory.

The following examples illustrate the uses of various hardening agents in the production of refractory bodies with phosphate binders.

EXAMPLE 11

Columniform refractory bodies (50 mm. x 50 mm.) of the following composition were shaped with a rammer and subjected to a couple of tests. The results are indicated in Table 1.

As hardening agents, those obtained in Examples 1–8 and Comparisons 1–3 were employed.

Compositions:                                                Parts
Fused silica—
  Coarse (>32 mesh) 50 ⎫
  Medium (32–100 mesh) 40 ⎬ 100
  Fine (<150 mesh) 10 ⎭
Aluminum phosphate binder (ca. 50% aqueous
  solution of mono aluminum phosphate) ____ 12
Hardening agent _____ 1.5

|  | Time after shaping (hr.) | | | | | Residual strength (kg./cm.²) (1,200 °C., 3-hr. firing) |
|---|---|---|---|---|---|---|
|  | 0.5 | 1.0 | 3.0 | 5.0 | 24.0 | |
|  | Compressive strength (kg./cm.²) | | | | | |
| Hardening agent, Example No.: | | | | | | |
| 1 | 0.25 | 0.50 | 2.5 | 6.0 | 18.0 | 110 |
| 2 | 0.18 | 0.46 | 2.8 | 6.8 | 17.0 | 115 |
| 3 | 0.34 | 0.58 | 2.42 | 7.0 | 20.0 | 120 |
| 4 | 0.33 | 0.58 | 2.5 | 6.9 | 18.0 | 115 |
| 5 | 0.20 | 0.50 | 2.8 | 7.0 | 17.0 | 115 |
| 6 | 0.25 | 0.50 | 2.6 | 6.5 | 17.5 | 110 |
| 7 | 0.15 | 0.30 | 1.8 | 8.0 | 16.5 | 120 |
| 8 | 0.24 | 0.52 | 2.4 | 5.5 | 17.5 | 110 |
| Comparison No.: | | | | | | |
| 1 | 0.05 | 0.05 | 0.05 | 0.15 | 0.5 | |
| 2 | 2.5 | 4.5 | 5.5 | 6.0 | 12.0 | 110 |
| 3 | 1.5 | 3.0 | 6.0 | 7.0 | 14.5 | 105 |

EXAMPLE 12

Comparison of the hardening abilities of the products of Example 1 (referred to as (a)) and Comparisons 1, 2 and 3 (referred to as (b), (c) and (d), respectively) was made on the same composition as in Example 11. These hardening agents were tested immediately after the preparation as well as after four weeks' storage at 60° C., 90% relative humidity (referred to as (a'), (b'), (c') and (d')).

The results are shown in FIG. 2 with the time after shaping on abscissa and compressive strength on ordinate.

As is clearly seen in FIG. 2, the hardening agent (a) shows no tendency to change in its hardening ability even after four weeks of standing under the abovementioned severe conditions (compare (a) with (a')).

On the other hand the active aluminum hydroxide just dried in the shade shows marked lowering of its hardening ability after the four weeks (c'), though it can cause rapid hardening right after the preparation (c).

Crystalline aluminum hydroxide treated with boric acid (b) is almost inactive as hardening agent from the beginning, while active aluminum hydroxide dried at 80° C. reveals, when used just after its preparation [(d)] and after four weeks' storage at the aforecited conditions [(d')], approximately the same compressive strength-standing hour correlation as (c) and (c') in each case.

EXAMPLE 13

Two molds of the same shape and size were formed using 100 parts of zircon and 14 parts of monoaluminum phosphate (as 50% aqueous solution) with and without hardening agent. With the one which had been hardened with 0.8 part of the product obtained in Example 3, no trouble was found in detaching from the prototype after three hours' standing, while the other without the use of hardening agent was not hard enough to be detached. The latter barely became detachable after 4 hours' heating in the oven at 60° C.

EXAMPLE 14

100 parts of a methanolic solution of aluminum-chromium primary phosphate ($Al_2O_3$ 1.5%, $Cr_2O_3$ 0.65%, $P_2O_5$ 6.4%), 125 parts of zircon sand, 78 parts of zircon flour and 3 parts of the hardening agent obtained in Example 7 were blended together to give a refractory coating composition. In addition to the lag time of start of hardening (i.e. induction period) which was originally observed with this type of hardening agents, a slightly suppressing effect of methanol was also observed. This composition could successfully be applied as surface coating on wood, metals, some kinds of plastics as well as usual refractory bodies to give an excellent refractory coating by drying only.

As is easily seen from the detailed description of the present invention given above, the novel hardening agents disclosed herein have a significant value in the industry, because they are easy to handle both in manufacturing and in storage having on fluctuation in their hardening ability and no substantial change with the lapse of time in contrast with active aluminum hydroxide itself.

In addition to the above merits, there seems to be another one that with the hardening agents of the present invention the so-called medium temperature strengths of hardened bodies are about four to ten times greater than with usual magnesia-type hardening agents, hence increasing the durabilites of refractory bodies in use.

Needless to say, the hardening agents of the present invention can be used in combination with other hitherto known hardening agents for the purpose of improving and/or regulating the hardening characteristics of the latter.

In the above explanation, only the hardening agents in the form of powder have been dealt with. It should be noted, however, that this does not necessarily mean a limitation and that hardening agents of the invention in the form of wet mixtures just before drying or even their suspensions can be used as such, if desired, without departing from the spirit and scope of the invention.

What we claim is:

1. A process of preparing a new hardening agent for refractory use in combination with a phosphate- or phosphoric acid-type binder, which comprises reacting in the presence of a proper amount of water an aluminum compound selected from the group consisting of alumium alcoholates and aluminum phenolate with a boric compound selected from the group consisting of boric acid, ammonium borate, alkali borates and boric esters in such a proportion as to bring the molar ratio, $Al_2O_3/B_2O_3$, within the range of about 1 to 24.

2. A process of preparing a hardening agent for refractory use in combination with a phosphate- or phosphoric acid-type binder which comprises reacting, in the presence of a proper amount of water, an aluminum alcoholate with a boric compound selected from the group consisting of boric acid, ammonium borate, alkali borates and boric esters in such a proportion as to bring the molar ratio, $Al_2O_3/B_2O_3$, within the range of about 1 to 24, and then igniting the reaction mixture to completely burn the liberated combustibles to obtain a dried product.

3. A process as claimed in claim 1 wherein said aluminum compound is an aluminum alcoholate and said boric compound is boric acid.

4. A process as claimed in claim 3 wherein said aluminum alcoholate has alkyl groups of one to five carbon atoms.

5. A process as claimed in claim 1 wherein said aluminum compound is an aluminum alcoholate and said boric compound is a boric ester.

6. A process as claimed in claim 5 wherein said aluminum alcoholate has alkyl groups of one to five carbon atoms and said boric ester has an alkyl group or alkyl groups of one to five carbon atoms.

7. A process of preparing a hardening agent for refractory use in combination with a phosphate- or phosphoric acid-type binder which comprises reacting in the presence of a proper amount of water an aluminum alcoholate with boric acid in such a proportion as to bring the molar ratio, $Al_2O_3/B_2O_3$, within the range of about 1 to 24 and igniting the reaction mixture to completely burn the liberated alcohol thus obtaining dried product.

8. A process as claimed in claim 2 wherein said boric compound is a boric ester.

9. A process as claimed in claim 7 wherein said aluminum alcoholate has alkyl groups of one to five carbon atoms.

10. A process as claimed in claim 8 wherein said boric ester has an alkyl group or alkyl groups of one to five carbon atoms.

11. In a refractory body having incorporated therein a phosphate- or phosphoric acid-type binder, the improvement which comprises the inclusion in said refractory body of a hardening agent consisting essentially of an active aluminum hydroxide-borate complex in which the molar ratio of $Al_2O_3:B_2O_3$ is about 1 to 24.

12. A method of preparing a refractory body which comprises mixing a refractory material with a phosphate- or phosphoric acid-type binder and a hardening agent consisting essentially of an active aluminum hydroxide-borate complex in which the molar ratio of $Al_2O_3:B_2O_3$ is about 1 to 24.

References Cited

UNITED STATES PATENTS 2,607,658   8/1952   Govett et al. ---------- 23—59

OTHER REFERENCES

Hackh's Chemical Dictionary, Fourth edition, McGraw-Hill Book Co., p. 32 (1969).

Cotton, F. A. and Wilkinson, G.: Advanced Inorganic Chemistry, Interscience publishers, p. 264 (1966).

JAMES E. POER, Primary Examiner

U.S. Cl. X.R.

106—85, 314